United States Patent
Groben

(10) Patent No.: US 11,480,198 B2
(45) Date of Patent: Oct. 25, 2022

(54) DAMPING DEVICE

(71) Applicant: HYDAC TECHNOLOGY GMBH, Sulzbach/Saar (DE)

(72) Inventor: Martin Groben, Sulzbach (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 67 days.

(21) Appl. No.: 16/980,494

(22) PCT Filed: Apr. 12, 2019

(86) PCT No.: PCT/EP2019/059519
§ 371 (c)(1),
(2) Date: Sep. 14, 2020

(87) PCT Pub. No.: WO2019/211084
PCT Pub. Date: Nov. 7, 2019

(65) Prior Publication Data
US 2021/0025412 A1    Jan. 28, 2021

(30) Foreign Application Priority Data

May 4, 2018 (DE) ..................... 10 2018 003 644.9

(51) Int. Cl.
*F15B 1/10* (2006.01)
*F16L 55/053* (2006.01)
(Continued)

(52) U.S. Cl.
CPC .................. *F15B 1/10* (2013.01); *F15B 1/22* (2013.01); *F16L 55/053* (2013.01);
(Continued)

(58) Field of Classification Search
CPC .. B60T 8/4068; F04B 11/0016; F15B 21/008; F15B 2201/205; F15B 2201/3151;
(Continued)

(56) References Cited

U.S. PATENT DOCUMENTS 2,290,337 A * 7/1942 Knauth ................. F16L 55/052
220/721
2,446,358 A * 8/1948 Yates .................... F16L 55/053
138/30
(Continued)

FOREIGN PATENT DOCUMENTS

DE    1 960 369     6/1971
DE    29 10 554     9/1980
(Continued)

OTHER PUBLICATIONS

International Search Report (ISR) dated Jul. 2, 2019 in corresponding International (PCT) Application No. PCT/EP2019/059519.

*Primary Examiner* — Robert K Arundale
*Assistant Examiner* — Richard K. Durden
(74) *Attorney, Agent, or Firm* — Wenderoth, Lind & Ponack, L.L.P.

(57) ABSTRACT

A damping device for fluids subject to pressure pulsations has at least one hydraulic accumulator (2). The accumulator housing (4, 6) contains a movable separating element (18), which separates a gas side (14) from a fluid room (16) and can be pressurized by a fluid present in the fluid room (16). A damper housing (34) having a second fluid room (38) is provided as a component of the accumulator housing (4, 6). Through the second fluid room (38), the fluid subject to pressure pulsations can flow. The second fluid room (38) contains a second movable separating element (40), which separates the second fluid room (38) from the first fluid room (16) of the hydraulic accumulator (2) without dead space.

17 Claims, 2 Drawing Sheets

(51) Int. Cl.
*F15B 1/22* (2006.01)
*F15B 21/00* (2006.01)

(52) U.S. Cl.
CPC ....... *F15B 21/008* (2013.01); *F15B 2201/205* (2013.01); *F15B 2201/3151* (2013.01); *F15B 2201/32* (2013.01); *F15B 2201/405* (2013.01); *F15B 2201/413* (2013.01)

(58) Field of Classification Search
CPC ...... F15B 2201/3153; F15B 2201/3158; F15B 2201/32; F15B 2201/405; F15B 2201/413; F16L 55/04; F16L 55/05; F16L 55/053
USPC .......................................................... 138/30
See application file for complete search history.

(56) References Cited

U.S. PATENT DOCUMENTS

| | | | | |
|---|---|---|---|---|
| 2,697,451 | A * | 12/1954 | Knauth | F15B 1/10 138/30 |
| 3,033,552 | A * | 5/1962 | Ogden | B60G 15/12 267/120 |
| 3,083,943 | A * | 4/1963 | Stewart, Jr. | F16K 31/1266 D23/233 |
| 3,628,573 | A * | 12/1971 | Loliger | F16L 55/052 138/30 |
| 3,919,061 | A * | 11/1975 | Jumer | C25F 3/16 205/668 |
| 3,933,172 | A * | 1/1976 | Allen | F16K 7/07 137/494 |
| 4,195,668 | A * | 4/1980 | Lewis | F16L 55/053 137/207 |
| 5,797,430 | A * | 8/1998 | Becke | F04B 11/0016 138/26 |
| 6,295,918 | B1 * | 10/2001 | Simmons | F04B 43/02 92/98 R |
| 6,357,482 | B1 * | 3/2002 | Rogers | F16L 55/053 138/27 |
| 6,644,354 | B2 * | 11/2003 | Dinkel | F15B 1/103 138/30 |
| 8,418,726 | B2 * | 4/2013 | Baltes | F15B 1/10 138/30 |
| 8,539,984 | B2 * | 9/2013 | Baltes | F15B 1/12 138/30 |
| 8,944,108 | B2 * | 2/2015 | Stroganov | F15B 3/00 138/30 |
| 2011/0192482 | A1 | 8/2011 | Baltes | |
| 2015/0013814 | A1 * | 1/2015 | Preston | F16H 57/027 138/30 |
| 2017/0106842 | A1 * | 4/2017 | Haeusser | B60T 8/4068 |
| 2017/0350354 | A1 * | 12/2017 | Ostrosky | F02M 37/0041 |

FOREIGN PATENT DOCUMENTS

| | | |
|---|---|---|
| DE | 102 24 675 | 12/2003 |
| DE | 10 2007 003 724 | 7/2008 |
| DE | 11 2016 000 511 | 11/2017 |
| FR | 1 605 326 | 8/1974 |
| WO | 2006/079931 | 8/2006 |
| WO | 2010/066321 | 6/2010 |

* cited by examiner

DAMPING DEVICE

FIELD OF THE INVENTION

The invention relates to a damping device for fluids subject to pressure pulsations, having at least one hydraulic accumulator. The accumulator housing of the hydraulic accumulator contains a movable separating element, which separates a gas side from a fluid room and can be pressurized by a fluid present in the fluid room.

BACKGROUND OF THE INVENTION

Damping devices, which have a hydraulic accumulator providing a flexible pressure cushion, are state of the art and are used in different fluid systems to smooth out occurring pressure pulsations. DE 10 2007 003 724 A1, for instance, shows a hydraulic accumulator, which can be used as a damper accumulator, in the form of a membrane accumulator. In various applications, such as chemical/food-chemistry or pharmaceutical applications, the damping devices are often used for different fluids that are successively conveyed through the damping device. To comply with the respective applicable cleanliness requirements, for instance to comply with the food regulations (FDA), contamination of the system must be precluded when the fluid conveyed is exchanged. Any fluid residues must be completely removed from the damping device.

The cleaning of damping devices is difficult. A major reason for the difficulties encountered in doing so is that it is hardly feasible or practically impossible to remove the fluid residues trapped between the separator element of the hydraulic accumulator and the accumulator wall, with which the separator element is in contact during the cleaning process when the fluid room is not pressurized. One is then forced to disassemble, clean and reassemble the hydraulic accumulator. This process is complex and expensive, as sealing elements also have to be replaced, so that the process takes time and results in a long downtime of the system.

SUMMARY OF THE INVENTION

With regard to this problem, the invention addresses the object of providing a damping device of the genus mentioned, which can be used efficiently and economically, even when used for fluids of various kinds.

According to the invention, this object is basically achieved by a damping device having, as an essential feature of the invention, a damper housing having a second fluid room is provided as a component of the accumulator housing. Through the second fluid room, the fluid subject to pressure pulsations can flow and the second fluid room contains a second movable separating element, which separates the second fluid room from the first fluid room of the hydraulic accumulator without dead space. Because the fluid present in the fluid room of the hydraulic accumulator and acting on the first separating element is separated from the fluid to be damped by the second separating element, the fluid to be damped remains out of contact with the fluid present in the fluid room of the hydraulic accumulator and pressurizing the first separating element. Although the fluid room of the hydraulic accumulator is pressurized by the pressure pulsations of the fluid to be damped via the movable second separating element during operation, so that the hydraulic accumulator providing the damping pressure cushion, the cleaning measures to be performed are limited exclusively to the damper housing, which solely comes into contact with the fluid to be damped. Because the second separating element delimits the second fluid room in the damper housing without any dead space, cleaning can be performed easily by flushing the damper housing. The measures for cleaning the hydraulic accumulator, including disassembly and reassembly of the accumulator, can be omitted. The damping device can therefore be cleaned in operation, so to speak, avoiding longer standstill times.

Advantageously, the damper housing can be detachably attached to the accumulator housing. When the fluid to be damped is exchanged, another option is replacing a previously operated damper housing with a cleaned new damper housing.

With particular advantage, a chemically neutral separating liquid can be inserted in the first fluid room. The neutral separating liquid does not cause contamination of the fluid system to be damped in the event of failure of the second separating element.

In advantageous embodiments, at least one of the separation elements is formed by a membrane. Preferably, both separation elements are formed by one membrane each.

In particularly advantageous embodiments, the second fluid room in the damper housing is formed by a circular cylindrical trough. The interior of this trough is delimited by the second separating element in the direction of the hydraulic accumulator and has a fluid inlet and a fluid outlet opposite from each other.

In this respect, the arrangement can be advantageously made such that, to form a centrifugal flushing of the interior of the trough, at least the fluid inlet opens into the interior in a direction inclined towards the inner wall of the trough. Due to the cyclone effect created in this way, a particularly effective cleaning can be achieved by a flushing process.

An increased cyclone effect can be achieved if the fluid inlet and outlet are offset from each other heightwise relative to the housing axis.

The membrane of the hydraulic accumulator, at least in its end position, is curved hemispherically in the direction of the damper housing and is preferably formed by a rolling membrane.

In particularly advantageous embodiments, the membrane forming the second separating element delimits the interior of the damper housing in each of its motion states without dead space and is articulated at the separation point between the accumulator housing and the damper housing.

For a formation of the interior of the damper housing completely free of dead space, the membrane delimiting the interior of the trough of the damper housing is formed by a flat membrane. In this way, the membrane delimits the flow space or the second fluid room with alternating positive and negative protrusions or vaults. In addition, because the membrane is clamped end-sided in the accumulator housing, there is no space between the membrane and the assigned wall parts of the accumulator housing, which could otherwise unintentionally collect dirt, including in the form of parasitic microbes, etc. In particular, the movable membrane arrangement does not need to have any "undercut" formation.

In order to meet the requirements placed on the material of the membranes in the respective applications, the arrangement is advantageously such that at least one membrane, preferably both membranes, is/are formed from PTFE or an elastomer and particularly preferably both membranes, from PTFE or an elastomer and particularly preferably from a compound containing PTFE, a fabric and an elastomer.

The accumulator housing and the damper housing can be interconnected with each other by a detachable screw connection.

With regard to the hydraulic accumulator, the arrangement can be advantageously made such that the accumulator housing has a multi-part structure and such that the point of articulation of the membrane of the hydraulic accumulator is fixed by clamping between separable housing parts of the accumulator housing.

Furthermore, a filling port for filling the first fluid room with the separating liquid is formed in the housing part of the accumulator housing which has the screw connection with the damper housing.

To meet the purity requirements, in advantageous embodiments the metal parts in contact with the medium are electropolished.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
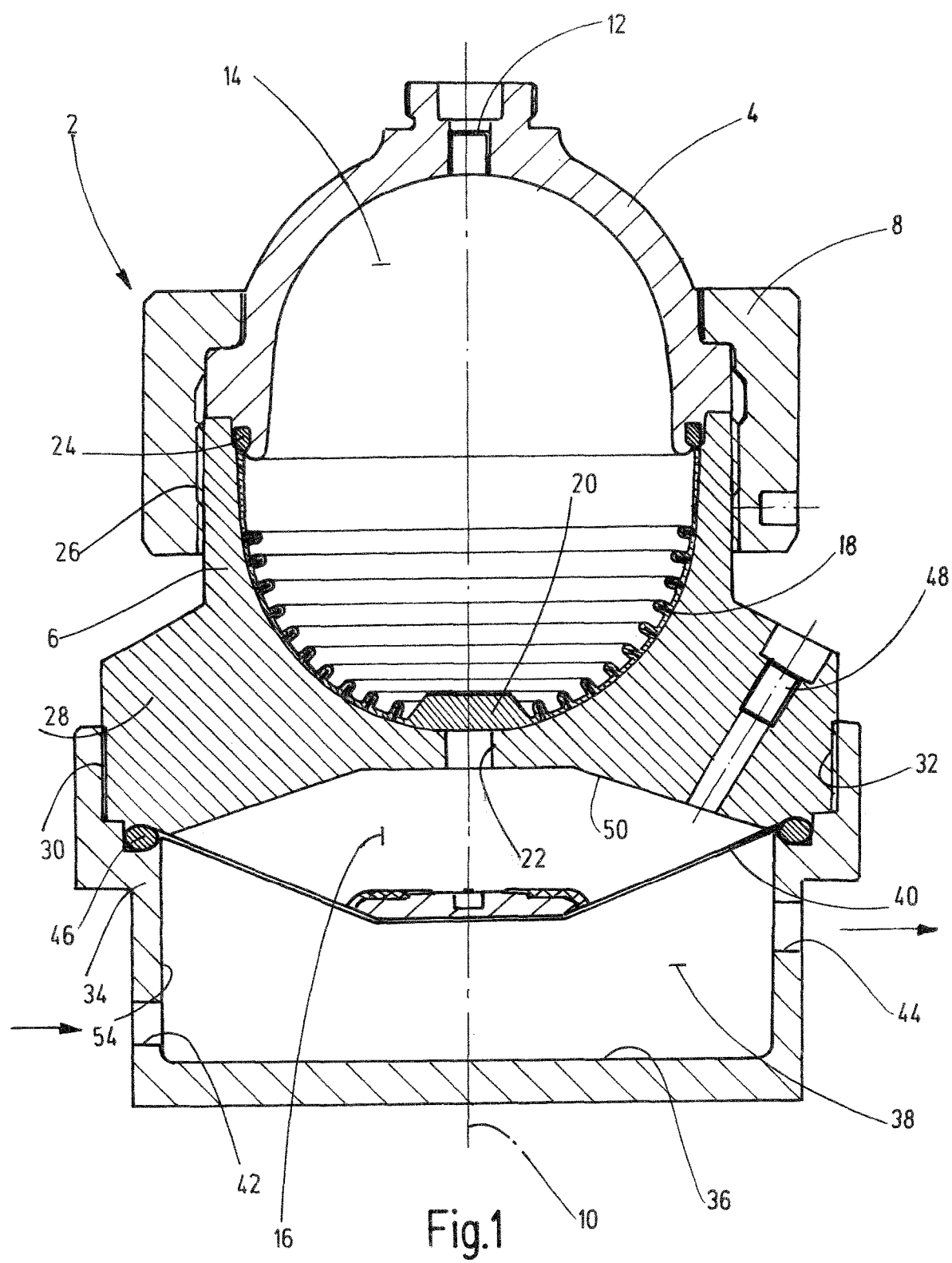
FIG. 1 is a side view in section of a damping device according to an exemplary embodiment of the invention.

The embodiment shown in the drawing has a hydraulic accumulator in the form of a hydropneumatic membrane accumulator 2. The structure of membrane accumulator 2 essentially matches the pressure accumulator shown in DE 10 2007 003 724 A1. The accumulator housing is of multi-part construction of the housing parts 4 and 6 detachably attached to each other by a union nut 8. The housing part 4, at the top in FIG. 1, has the shape of half a hollow sphere, on which there is a filling port 12, coaxial with the vertical axis 10, for a working gas, such as $H_2$. The inner wall of the lower housing part 6 has the shape of a hemispherical calotte. A rolling membrane 18 is provided as the membrane that forms the movable separating element between the gas side or chamber 14 adjacent to the filling port 12 and the fluid room or chamber 16 of the accumulator 2. In the end position shown in FIG. 1, this rolling membrane 18 is hemispherically curved and rests against the inner wall of the lower housing part 6. A centrally located end reinforcement 20, coaxial to the axis 10, of the rolling membrane 18 covers a wall passage 22 in the lower housing part 6, which is part of the fluid room 16. The circumferential rim of the rolling membrane 18 has, as per usual for such membranes, a reinforcing edge bead 24, which is used to articulate and retain the rolling membrane 18 at the connection point between the upper housing part 4 and the lower housing part 6 in a clamped manner.

The housing part 6 has below an outer thread 26 intended for the screw connection with the union nut 8 and has a circular cylindrical end part 28 having an enlarged outside diameter. On the end part 28, there is a further outer thread 30. In conjunction with an inner thread 32 on the circumferential edge of a damper housing 34, a screw connection is formed by which the damper housing 34, as a further component of the accumulator housing, can be detachably attached to its housing part 6. The interior of the damper housing 34 has the shape of a circular cylindrical housing pot having a closed, planar bottom 36. The interior of the trough forms, in conjunction with the part adjoining the bottom 36, a second fluid room or chamber 38, which is separated from the first fluid room 16. First fluid room 16 extends to the outside of the rolling membrane 18 via the passage 22 and forms the fluid room associated with the hydraulic accumulator 2. A flat membrane 40 forms a second movable separating element.

The fluid to be damped can flow through the second fluid room 38 in the damper housing 34. Damper housing 34 has a fluid inlet 42 and a fluid outlet 44 on damper housing sides diametrically opposite to each other. The inlet 42 and the outlet 44 are, as shown in FIG. 1, vertically offset from each other in the direction of the axis 10. The inlet 42 is adjacent to the bottom 36. The flat membrane 40 has a circumferential reinforcement in the form of an edge bead 46, which is used to articulate and retain the flat membrane 40 at the separation point between the damper housing 34 and the housing end part 28 of the hydraulic accumulator 2 by clamping by the screw connection formed by the outer thread 30 and the inner thread 32. The flat membrane 40 then spans the second fluid room 38 in the damper housing 34 without any dead space, i.e. without forming an undercut where dirt or residues can possibly accumulate unintentionally. A filling port 48 for introducing a separating liquid is provided in the housing end part 28 for filling the first fluid room 16 assigned to the hydraulic accumulator 2.

FIG. 1 shows an operating condition in which there is no system pressure in the second fluid room 38, through which the fluid to be damped can flow. Both the rolling membrane 18 as the first separating element and the flat membrane 40 as the second separating element are in a downward curved end or maximum stretched position under the influence of the pre-charge pressure present on the gas side 14 of the hydraulic accumulator 2. The rolling membrane 18 rests against the inner wall of the housing. The flat membrane 40 is located at a distance from the lower end surface 50 of the housing end part 28. As shown, the end surface 50 is not flat, but is trough-shaped recessed in the direction of the central passage 22. A free space then is formed towards the top beyond the plane of the edge bead 46 for working motions of the flat membrane 40. During damper operation, in which the system pressure including the pressure pulsations to be damped is effective in the second fluid room 38, the system pressure is effective via the flat membrane 40 and the adjacent incompressible separating fluid at the outside of the rolling membrane 18 of the hydraulic accumulator 2, which forms the damping accumulator. A chemically neutral liquid is provided as the separating liquid, so that in the event of a possible failure of the flat membrane 40, no contamination of the connected pure fluid system is caused.

Figure 2:
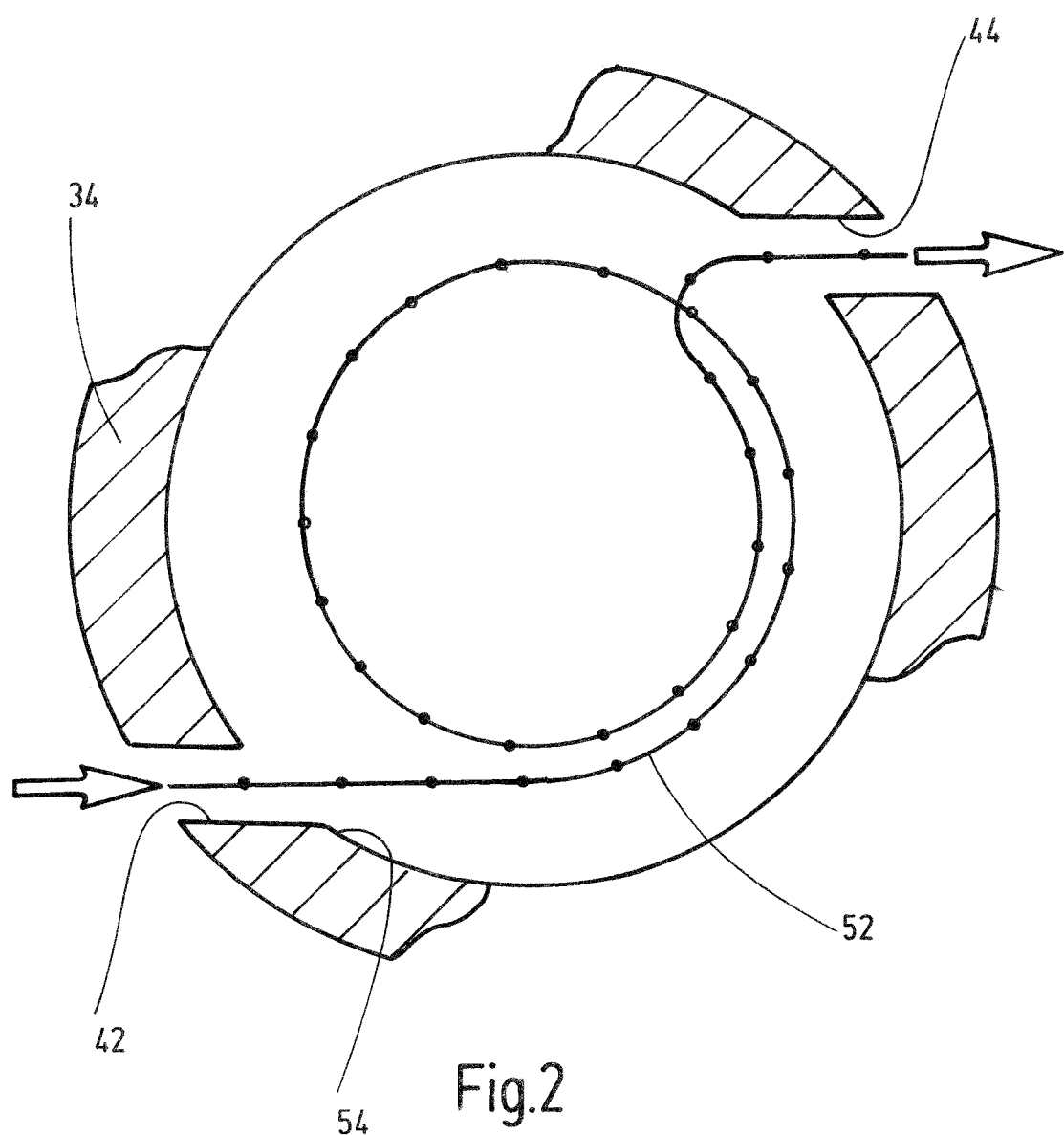
FIG. 2 is a schematically simplified, plan view in section of the housing pot of the damper housing of the embodiment in accordance with FIG. 1.

For cleaning, for instance when changing the fluid to be damped, the second fluid room 38 can be flushed using a flushing fluid without dismantling the hydraulic accumulator 2. Because the flat membrane 40 delimits the fluid room 38 without any dead space, all fluid residues can be removed. As FIG. 2 shows, the fluid inlet 42 and the outlet 44 are not only offset in height relative to each other, but the inlet 42 provides a flow direction for the incoming fluid that is inclined towards the inner wall of the trough 54, which creates a tangential flow 52 in the trough of the damper housing 34. A centrifugal flushing then develops in the interior of the trough. This structure of inlet 54 not only permits fluid residues to be flushed out particularly thoroughly, but the cyclone effect in the trough also prevents the danger of agglomerates of the fluid accumulating on the inner wall of the trough 54 during damper operation.

The membranes 18 and 40 are made of a material that meets the requirements of the respective application. PTFE or an elastomer or a compound can be used for this purpose. Advantageously, a compound containing PTFE, a fabric and an elastomer can be provided. Such a material is heat-resistant, universally applicable and compatible with the food requirements (FDA). To meet the cleanliness requirements in a particularly reliable manner, in the damping device according to the invention, metal parts in contact with media are electropolished.

While one embodiment has been chosen to illustrate the invention, it will be understood by those skilled in the art that various changes and modifications can be made therein without departing from the scope of the invention as defined in the claims.

The invention claimed is:

1. A damping device for fluids subject to pressure pulsations, the damping device comprising:
    a hydraulic accumulator having an accumulator housing containing a movable first separating element separating a gas chamber from a first fluid chamber inside the accumulator housing, the first separating element being pressurizable by fluid in the first fluid chamber, the first separating element being a rolling membrane;
    a damper housing being coupled to the accumulator housing and having a second fluid chamber, the second fluid chamber being a passage through which the fluid subject to pressure pulsations can flow and containing a movable second separating element separating the second fluid chamber from the first fluid chamber without dead space in the second fluid chamber by not contacting wall surfaces of the damper housing defining the second fluid chamber even in a maximum stretch position of the second separating element, the second separating element delimiting a trough of the damper housing and being a flat membrane;
    wall parts of the accumulator housing extending between the first and second separating elements and spanning the first fluid chamber, the first and second separating elements engaging the wall parts in fully displaced positions of the first and second separating elements;
    a permanent passage in the wall parts connecting adjacent first and second partial chambers of the first fluid chamber in fluid communication, the first partial chamber being delimited by the first separating element, the second partial chamber being delimited by the second separating element; and
    a chemically neutral separating liquid in the first fluid chamber so as to not to cause contamination of or adversely affect the fluid in the second fluid chamber to be dampened upon failure of the second separating element.

2. A damping device according to claim 1 wherein the damper housing is detachably attached to the accumulator housing.

3. A damping device according to claim 1 wherein the accumulator housing comprises an upper housing part co-delimiting the gas chamber, the upper housing part, the wall parts and the damper housing are secured to one another by screw connections.

4. A damping device according to claim 1 wherein the trough of the damper housing is a circular cylindrical trough with an interior delimited by the second separating element in a direction of the hydraulic accumulator and has a fluid inlet and a fluid outlet opposite each other.

5. A damping device according to claim 4 wherein the fluid inlet opens into the interior of the trough in a direction inclined towards an inner side and extending in a side wall of the circular cylindrical trough so as to be configured to cause a centrifugal flushing of the interior.

6. A damping device according to claim 4 wherein the fluid inlet and the fluid outlet are offset relative to each other along a longitudinal axis of the circular cylindrical trough.

7. A damping device according to claim 4 wherein the fluid inlet and fluid outlet are arranged in the damper housing offset relative to each other in horizontal and vertical directions so as to be configured to generate a cyclonic fluid flow in the second fluid chamber.

8. A damping device according to claim 1 wherein the rolling membrane in an end position is curved hemispherically in a direction of the damper housing.

9. A damping device according to claim 1 wherein the flat membrane forming the second separating element delimits an interior of the damper housing and is articulated and retained at the separation point between the accumulator housing and the damper housing.

10. A damping device according to claim 1 wherein the first and second separating elements are formed from at least one of PTFE or an elastomer.

11. A damping device according to claim 1 wherein the first and second separating elements are each formed of PTFE, a fabric and an elastomer.

12. A damping device according to claim 1 wherein the accumulator housing and the damper housing are interconnected with each other by a detachable screw connection.

13. A damping device according to claim 1 wherein the accumulator housing comprises first and second separable parts, the first separating element is articulated and clamped between the first and second separable parts of the accumulator housing.

14. A damping device according to claim 1 wherein the first fluid chamber has a filling port in a housing part of the accumulator housing capable of filling the first fluid chamber with the separating liquid, the housing part of the accumulator housing has a screw connection with the damper housing.

15. A damping device according to claim 1 wherein of the accumulator housing and the damper housing have metal parts with electropolished surfaces that contact fluid.

16. A damping device according to claim 1 wherein the damper housing has a flat base and a side wall extending perpendicularly from the flat base, a fluid inlet and a fluid outlet extend through the side wall at locations spaced from one another along a circumference of the side wall.

17. A damping device according to claim 16 wherein the fluid inlet extends in the side wall in a direction angularly offset from a center of the second fluid chamber.

* * * * *